(12) United States Patent
Hunter

(10) Patent No.: US 7,771,767 B2
(45) Date of Patent: Aug. 10, 2010

(54) EXTRUSION DIE WITH EXTRUSION PORTS HAVING A SHAPED EXTRUSION OUTLET

(75) Inventor: Thomas B. Hunter, Collinsville, IL (US)

(73) Assignee: Kerry, Inc., Beloit, WI (US)

( * ) Notice: Subject to any disclaimer, the term of this patent is extended or adjusted under 35 U.S.C. 154(b) by 95 days.

(21) Appl. No.: 12/071,393

(22) Filed: Feb. 20, 2008

(65) Prior Publication Data

US 2008/0241327 A1  Oct. 2, 2008

Related U.S. Application Data

(60) Provisional application No. 60/902,348, filed on Feb. 21, 2007.

(51) Int. Cl.
*A21C 11/16* (2006.01)
*A21C 11/10* (2006.01)

(52) U.S. Cl. .................. 426/516; 425/311; 425/464

(58) Field of Classification Search .......... 425/310, 425/311, 382 R, 382.3, 461, 464; 426/500, 426/516, 518; 264/148
See application file for complete search history.

(56) References Cited

U.S. PATENT DOCUMENTS

| | | | |
|---|---|---|---|
| 1,340,371 | A | 5/1920 | Bradbury |
| 1,566,705 | A | 12/1925 | Tanzi |
| 1,902,953 | A | 3/1933 | Hazell |
| 2,149,066 | A | 2/1939 | Orsini |
| 2,429,042 | A | 10/1947 | Bader |
| 2,638,855 | A | 5/1953 | Maldari |
| 2,700,943 | A | 2/1955 | Kretchmer |
| 2,712,291 | A | 7/1955 | Groff |
| 2,713,313 | A | 7/1955 | Femina |
| 3,767,338 | A | 10/1973 | Soderlund et al. |
| 3,806,617 | A | 4/1974 | Smylie et al. |
| 3,876,743 | A | 4/1975 | Soderlund et al. |
| 4,803,091 | A | 2/1989 | Mottur et al. |
| 5,149,555 | A | 9/1992 | Flindall |
| 5,167,980 | A | 12/1992 | Herod et al. |
| 5,641,529 | A | 6/1997 | Kunas |
| 5,670,185 | A | 9/1997 | Heck et al. |

(Continued)

FOREIGN PATENT DOCUMENTS

JP   60-221068 A   11/1985

(Continued)

*Primary Examiner*—James Mackey
(74) *Attorney, Agent, or Firm*—Birch, Stewart, Kolasch & Birch, LLP

(57) ABSTRACT

A cutter assembly for an extruder includes an elongated extrusion member having an open feed end. The open feed end is attachable in fluid communication with a manifold of the extruder for supplying a mash thereto. An extrusion die is supported on the elongated extrusion member. The extrusion die includes a plurality of extrusion outlets formed therein. A cutter member cuts extrudate to a desired length as the extrudate exits the die. The cutter member is slidable on the extrusion member in a direction of elongation of the extrusion member. The cutter member is operably connectable at the drivable end to a drive device of the extruder for reciprocatably sliding the cutting surface of the cutter member over and away from the extrusion die. The shape of the extrusion outlets twist the mash as the mash exits the extrusion die in order to form a twisted food product.

18 Claims, 7 Drawing Sheets

U.S. PATENT DOCUMENTS

| | | |
|---|---|---|
| 5,773,043 A | 6/1998 | Hunter |
| 6,450,796 B1 | 9/2002 | Groff et al. |
| 6,511,309 B1 | 1/2003 | Hunter |
| 6,626,660 B1 | 9/2003 | Olson et al. |
| 6,722,873 B2 | 4/2004 | Bortone |
| 6,770,233 B2 | 8/2004 | Bortone et al. |
| 6,805,543 B2 | 10/2004 | Fux et al. |
| 6,896,504 B2 | 5/2005 | Horna et al. |
| 6,964,562 B2 | 11/2005 | Hunter |
| 7,270,531 B2 * | 9/2007 | Proulx et al. ............. 425/382.3 |
| 7,320,279 B2 * | 1/2008 | Hunter ....................... 425/311 |
| 2004/0216619 A1 | 11/2004 | Hunter |
| 2006/0165860 A1 | 7/2006 | Lowry et al. |

FOREIGN PATENT DOCUMENTS

JP          61-216645 A          9/1986

* cited by examiner

EXTRUSION DIE WITH EXTRUSION PORTS HAVING A SHAPED EXTRUSION OUTLET

This Nonprovisional application claims priority under 35 U.S.C. §119(e) on U.S. Provisional Application No(s). 60/902,348 filed on Feb. 21, 2007, the entire contents of which are hereby incorporated by reference.

BACKGROUND OF THE INVENTION

1. Field of the Invention

The present invention relates to a cutter assembly for an extruder for extruding twisted food pieces. More particularly, the present invention relates to an extruder cutter assembly, which includes an extrusion die having extrusion ports that are shaped to twist the food pieces when exiting the extrusion die.

2. Description of Background Art

Extruders for producing extruded food pieces are known. Such extruders can conventionally include a pressure vessel for containing, under pressure, a mash of the food to be extruded. Furthermore, pressure exerting means for maintaining pressure in the pressure vessel, a manifold in fluid communication with the pressure vessel, and a cutter assembly, generally located underneath the pressure vessel, in fluid communication with the manifold can be included. The extruder cutter assembly cuts the extruded food to size. An extruder of the above type is disclosed, for example in U.S. Pat. No. 5,773,043 to Hunter (hereinafter "the '043 patent"). The '043 patent is hereby incorporated by reference.

Food products that can be extruded in such extruders include, e.g., meats, poultry, seafood, cereal grains, vegetables, fruits, and solid dairy products. As specific examples, the mash may be prepared from beef, chicken, shrimp, wheat, corn, rice, potatoes, apples, and cheese.

The food is ground to a particle size consistent with forming a fluid mash, e.g., particle sizes that will pass through a U.S. Screen Series No. 5 screen, more usually a No. 10 screen, and often a No. 20 screen up to about a No. 100 screen.

Water or other dispersing liquids, e.g., 3% to 70%, may be added to the ground food in order to produce a liquid mash. Binders, flavors, preservatives, colors, stabilizers, antioxidants, and the like may be added to the mash, in conventional amounts. Most often, a gelling material is added to the mash, e.g., a settable gum or pectate, for example, guar gum and sodium alginate, in conventional amounts of about 0.1% to 25%. The gum or pectate is set by a gelling agent, e.g., a 0.5% to 10% solution of calcium chloride and sodium alginate.

In the '043 patent, an extruder cutter assembly extrudes a food piece in the shape of a natural food piece. The extruder cutter assembly includes an extrusion member and a tubular cutter member for cutting extrudate exiting the extrusion member. However, the '043 patent does not include a die having shaped extrusion ports that twist the food pieces when exiting the die as in the present invention.

The present inventor has also invented an extruder cutter assembly for extruding foodstuff containing a filling. In U.S. Pat. Nos. 6,511,309 and 6,964,562 (hereinafter "the '309 patent" and "the '562 patent", respectively), an extruder cutter assembly includes a filling tube or passageway for extruding a filling along with the mash of food to form a filled food product. An extension is formed on the extrusion member and the cutter member to allow for the extrudate to exit the extruder cutter assembly from the side. This extension to the extrusion member and cutter member is similar to the present invention. However, the extruder cutter assembly in the '309 patent and the '562 patent does not include a die having shaped extrusion ports that twist the food pieces when exiting the die as in the present invention. The '309 patent and the '562 patent are hereby incorporated by reference.

SUMMARY OF THE INVENTION

It is an object of the present invention to provide cutter assembly for an extruder, which makes up for the above deficiencies of the background art. Specifically, it is an object of the present invention to provide an extruder cutter assembly, which can form an extruded product that is twisted when exiting the extrusion die.

In order to accomplish the above objects of the present invention, a cutter assembly for an extruder comprises:

an elongated extrusion member having an open feed end, said open feed end being attachable in fluid communication with a manifold of the extruder for supplying a mash to said elongated extrusion member;

an extrusion die supported on said elongated extrusion member, said extrusion die including a plurality of extrusion outlets formed therein; and a cutter member having an open drivable end, an elongated cutter wall, and an open cutter end with a cutting surface for cutting extrudate to a desired length as the extrudate exits the die, said cutter member being disposed at least partially over and reciprocally slidable on the extrusion member in a direction of elongation of the extrusion member, said cutter member being operably connectable at the drivable end to a drive device of the extruder for reciprocatably sliding the cutting surface of the cutter member over and away from the extrusion die, wherein each of said plurality of extrusion outlets is shaped to have at least one wide portion and at least one narrow portion, the shape of the extrusion outlets twisting the mash as the mash exits the extrusion die in order to form a twisted food product.

In addition, the above objects of the present invention can be, accomplished by a method of making a twisted food product, said method comprising the steps of:

providing an elongated extrusion member having an open feed end, said open feed end being attachable in fluid communication with a manifold of an extruder for supplying a mash to said elongated extrusion member;

providing an extrusion die supported on said elongated extrusion member, said extrusion die including a plurality of extrusion outlets formed therein, each of said plurality of extrusion outlets being shaped to have at least one wide portion and at least one narrow portion, the shape of the extrusion outlets twisting the mash as the mash exits the extrusion die;

providing a cutter member having an open drivable end, an elongated cutter wall, and an open cutter end with a cutting surface for cutting extrudate to a desired length as the extrudate exits the die, said cutter member being disposed at least partially over and reciprocally slidable on the extrusion member in a direction of elongation of the extrusion member, said cutter member being operably connectable at the drivable end to a drive device of the extruder for reciprocatably sliding the cutting surface of the cutter member over and away from the extrusion die; and extruding the mash while twisting the mash to form a twisted food product.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
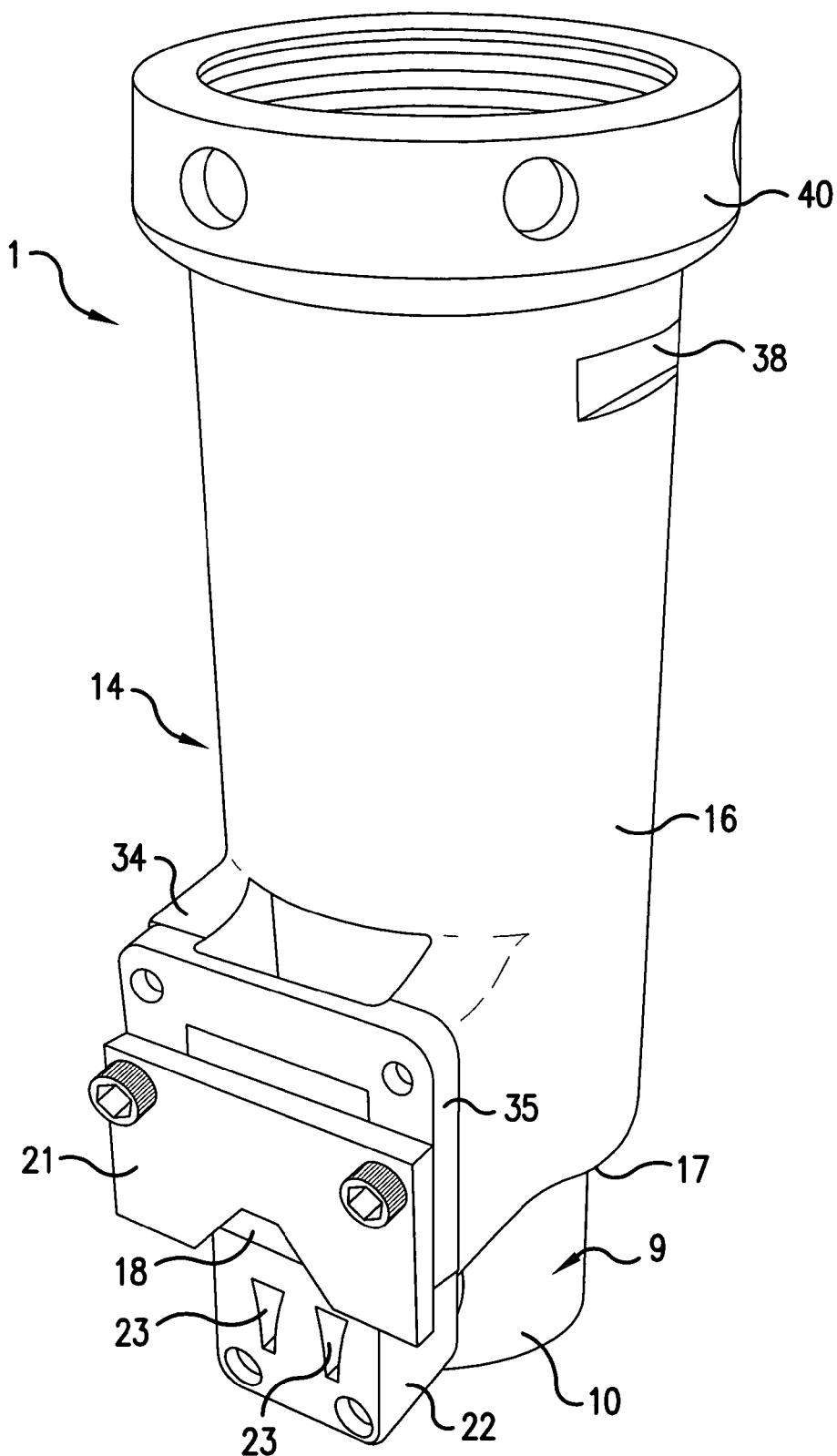
FIG. 1 is a perspective view of the extruder cutter assembly of the present invention.

The present invention will now be described with reference to the accompanying drawings in which the same reference numerals have been used to identify the same or similar elements.

Figure 2:
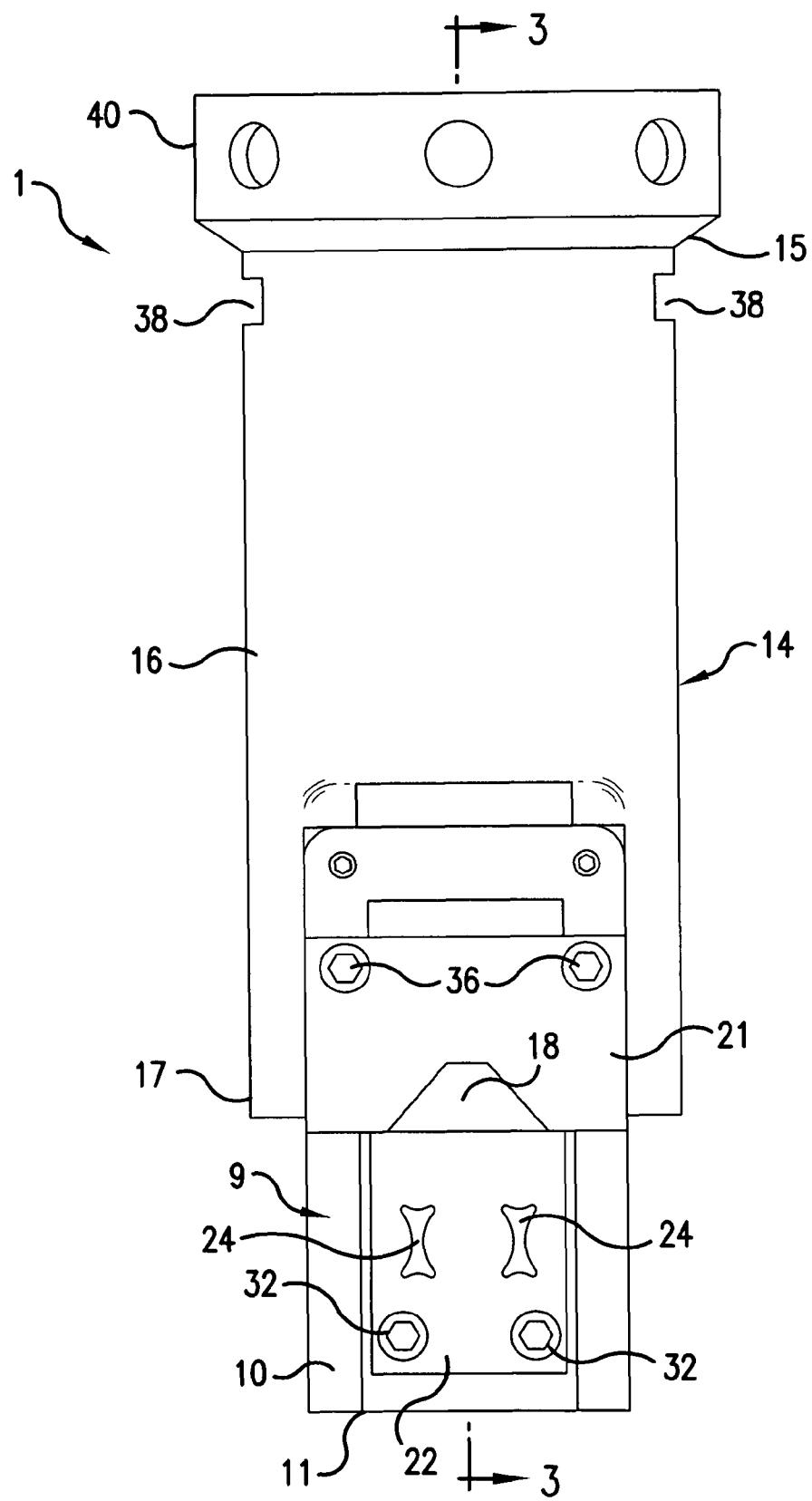
FIG. 2 is a front elevation of the extruder cutter assembly of the present invention illustrating the "ready to cut" state.

FIGS. 1 and 2 illustrate the die and cutter assembly of the present invention in the "ready to cut" state. Referring to FIGS. 1-2, the die and cutter assembly of the present invention 1 includes an elongated annular extrusion member 9 having a generally tubular extrusion wall 10. An extrusion end cap 11 is connected to the extrusion wall 10 to close a bottom end of the annular extrusion member 9 and an open feed end 12 (see FIG. 3) is formed adjacent an upper end of the extrusion member 9.

The die and cutter assembly 1 of the present invention is attachable to an extruder, such as the extruder described in U.S. Pat. No. 5,773,043, the entirety of which is hereby incorporated by reference, and will therefore not be described in detail. The open feed end 12 is attachable in fluid communication to a manifold (not shown) by, for example, a threaded flange 40. The manifold is connectable to a pressure vessel (not shown) for containing a mash under pressure by a pressure-asserting device (not shown).

Figure 3:
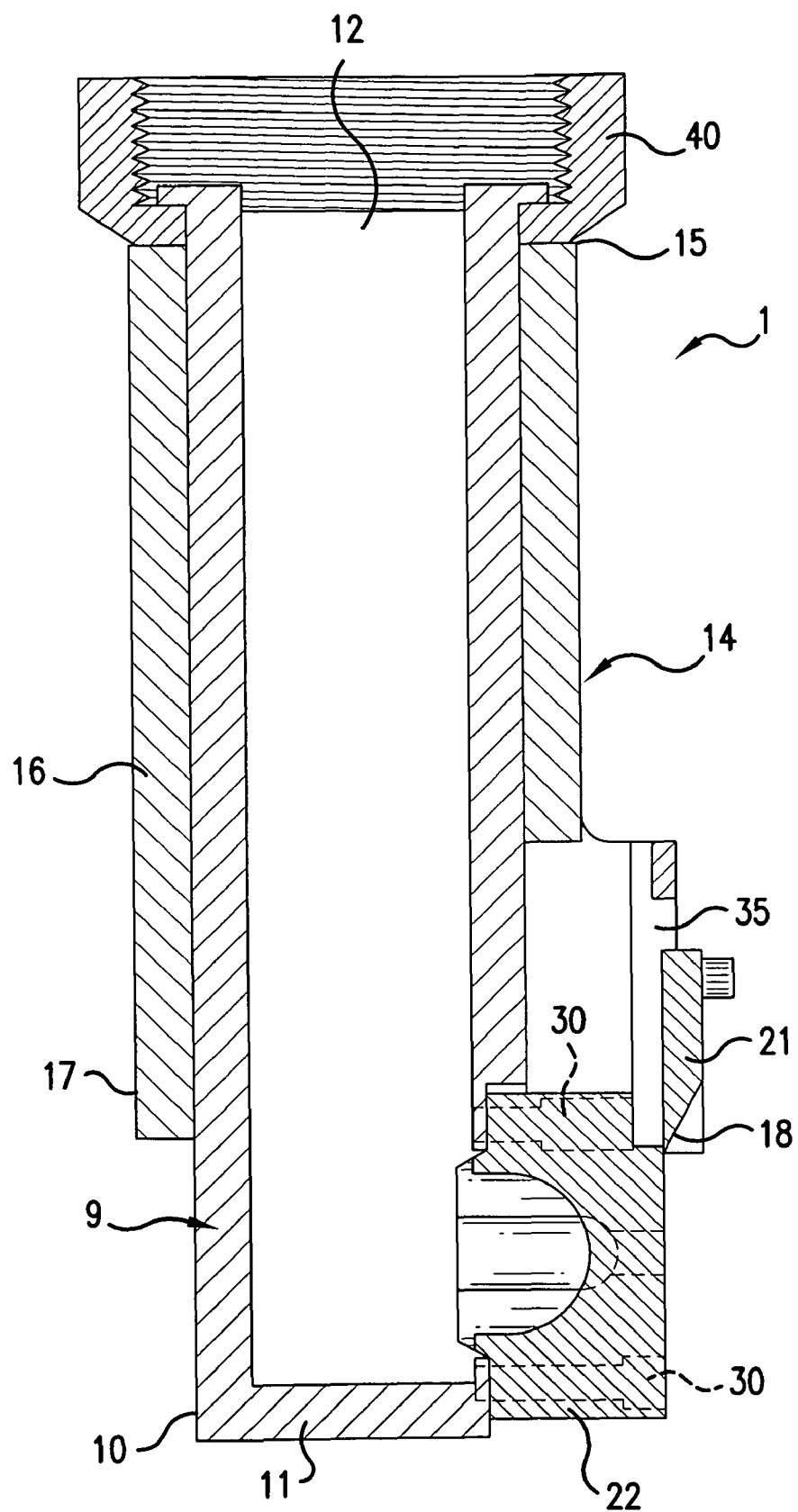
FIG. 3 is a cross-section of the extruder cutter assembly of the present invention along line 3-3 of FIG. 2.

The extrusion member 9 includes a die 22 mounted to the extrusion member 9 at a side surface thereof by, for example, a plurality of screws 32 which extend through respective holes 30 formed in the die 22 (see FIGS. 2 and 3). The die 22 cooperates with a cutting element 21 of a cutter member as will be described hereinbelow.

The die and cutter assembly 1 of the present invention also includes a tubular cutter member 14 having an open drivable end 15, an elongated cutter wall 16, and an open cutter end 17. The cutter wall 16 includes a housing or extension 34 formed thereon for supporting a cutting element 21. The cutting element 21 includes a cutting surface 18 for cooperating with the extrusion die 22 to cut and crimp extrudate to a desired length as the extrudate exits extrusion die 22. The cutting element 21 is mounted to a face plate 35 mounted on the extension 34 by a plurality of screws 36. The cutting surface 18 of the cutting element 21 is formed at an angle between 25 to 90° to a surface of said cutting element 21. Referring to FIG. 2, the elongated cutter wall 16 includes two cut-out portions 38 formed on an outside surface thereof adjacent the open drivable end 15. The cut-out portions 38 are for receiving the operable end of a drive device (not shown) in order to reciprocate the cutting member 14 and therefore the cutting element 21 up and down in cooperation with the extrusion die 22. The drive device can be any well known device for reciprocating the cutting member 14. It is also possible to provide a groove (not shown) around the outer circumference of the annular extrusion member 9 instead of the cut-out portions 38 as would be understood to one having ordinary skill in the art.

It is noted that the extrusion wall 10 and the cutter member 14 are illustrated having cooperating tubular shapes; however, it can be readily understood to one having ordinary skill in the art that they may be made in other cooperating shapes as well. All that is necessary is for the cutting member 14 to have an inside diameter of generally the same size and shape as the outside diameter and shape of the extrusion wall 10 to allow the cutting member 14 to reciprocate in a sliding manner on the outside of the extrusion wall 10.

Figure 6A:
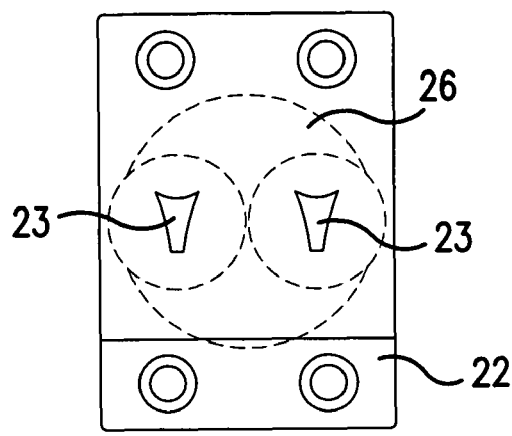
FIGS. 6A, 6B and 6C are front views of the die of the present invention.
Figure 6B:
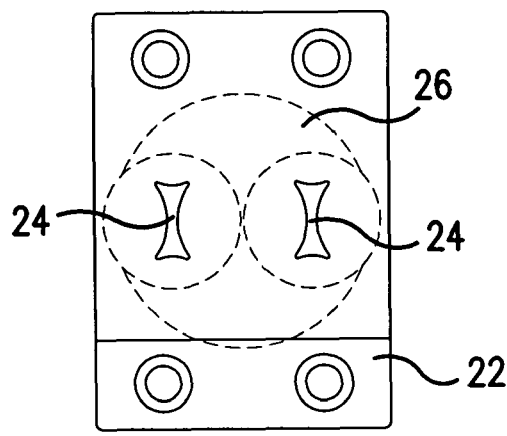
Figure 6C:
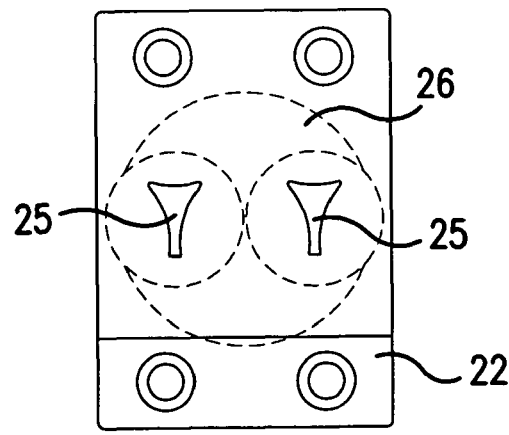
Figure 7:
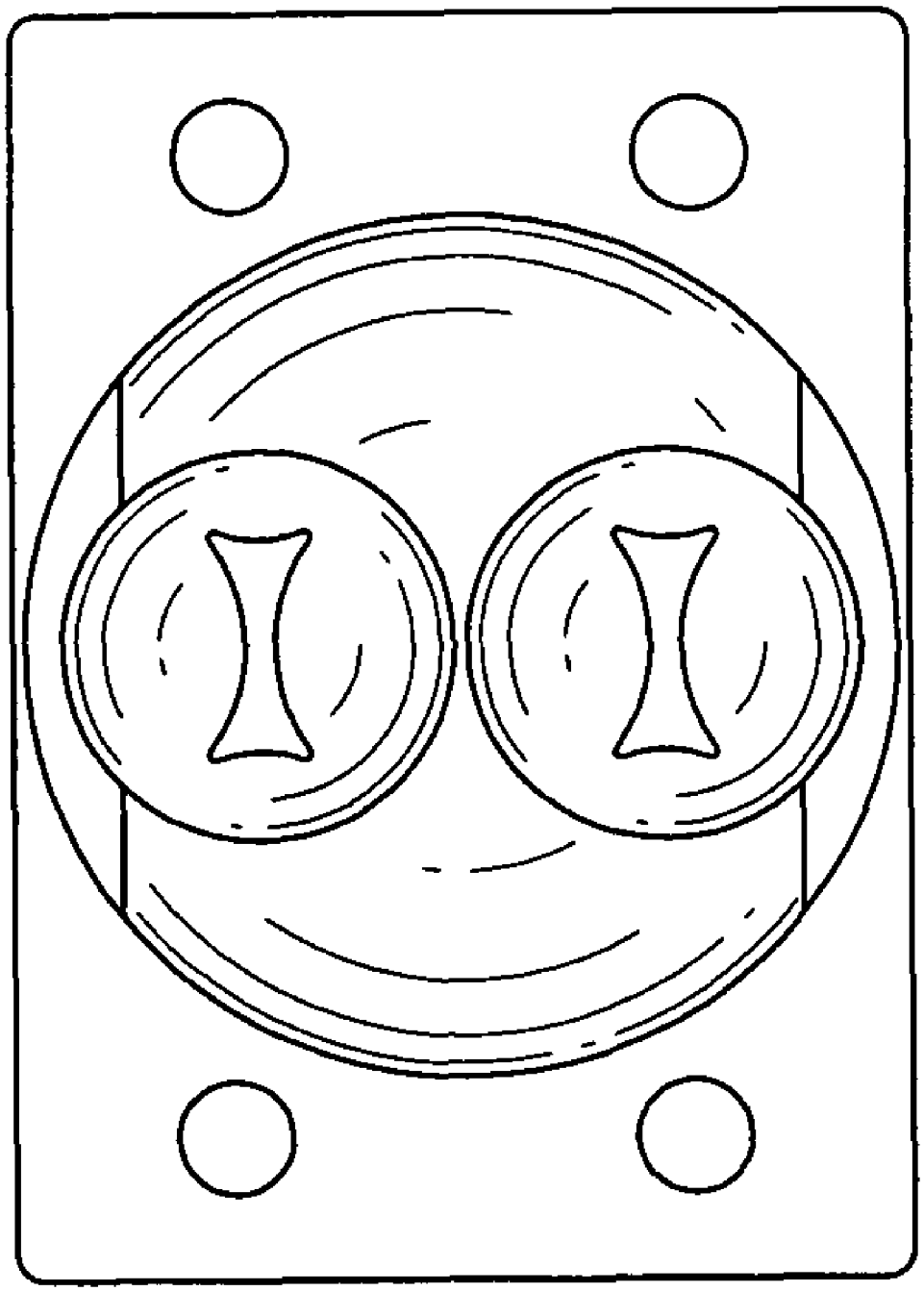
FIG. 7 is a rear view of the die of FIG. 6B.

Referring to FIGS. 6A-6C, a front view of the three alternative embodiments of the die 22 is illustrated. Referring specifically to FIG. 6A, the die 22 includes a pair of extrusion outlets 23, 23. Each of the extrusion outlets 23 is in the general shape of an upside down, truncated triangle having concave walls. The extrusion outlets 23 extend through the die 22 until they open up into a cavity 26 formed in a rear side of the die 22 (illustrated by the dashed line in FIGS. 6A-6C). Although not illustrated in FIG. 6A, the cavity 26 includes two sub-cavities that are centered on each of the extrusion outlets 23. The provision of the cavity 26 and the two sub-cavities provides a smooth transition for the mash to flow from inside of the annular extrusion member 9, into the cavity 26 and the sub-cavities, and out of the extrusion outlets 23.

Referring to FIGS. 6B and 6C, alternative shapes of the extrusion outlets formed in the die 22 are illustrated. The embodiments of FIGS. 6B and 6C are the same as the embodiment of FIG. 6A except for the shape of the extrusion outlets. Therefore, these embodiments will not be further described in detail.

In FIG. 6B, the extrusion outlets 24 are in the general shape of an hour glass having concave walls. In FIG. 6C, the extrusion outlets 25 are in the general shape of an upside down, truncated triangle with concave walls; however, the bottom of the triangle in FIG. 6C is narrower than the bottom of the triangle in FIG. 6A.

It should be noted at this time that the shape of the extrusion outlets 23, 24 and 25 causes the extrudate to twist while exiting the extrusion outlets. The size of the extrusion outlets also has an effect on the twisting of the extrudate. The twisted extrudate can then be cut to a desired size by the cutter member 14 to form a twisted food product.

In order to obtain a sufficient twisting of the extrudate, the extrusion outlets 23-25 should have a maximum height of approximately 0.3 to 0.4 inches and a maximum width of approximately 0.2 to 0.3 inches.

It should also be noted that the pressure of the mash has an effect on the twisting of the extrudate. Specifically, it is necessary for the extrusion pressure to be at a high pressure. For example, a pressure of greater than 100 lbs/in$^2$, preferably a pressure of greater than 150 lbs/in$^2$ will provide a desirable twist. If the pressure is too low, the twisting of the extrudate will not be formed in a desirable manner.

Figure 4:
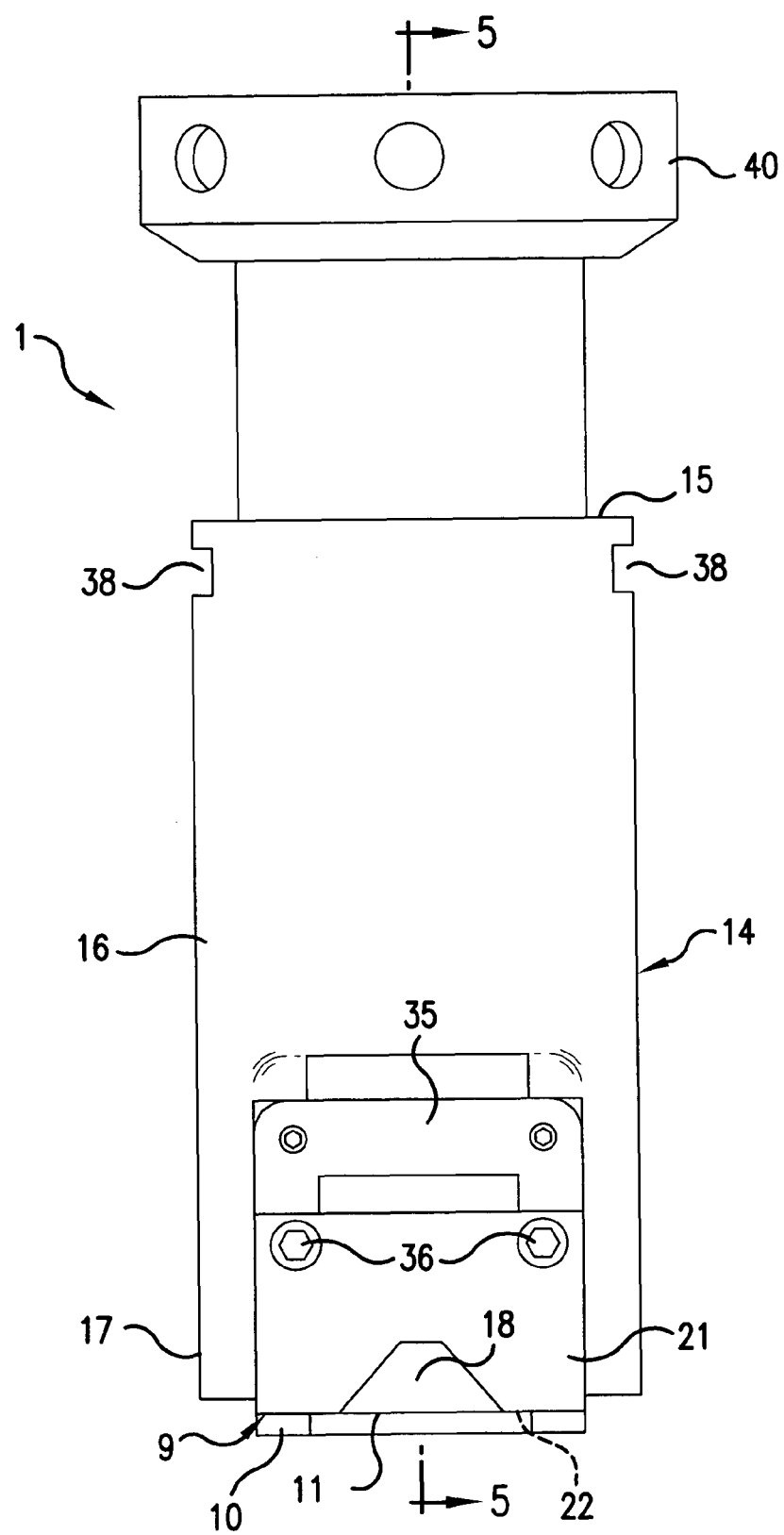
FIG. 4 is a front elevation of the extruder cutter assembly of the present invention illustrating the "after cut" state.
Figure 5:
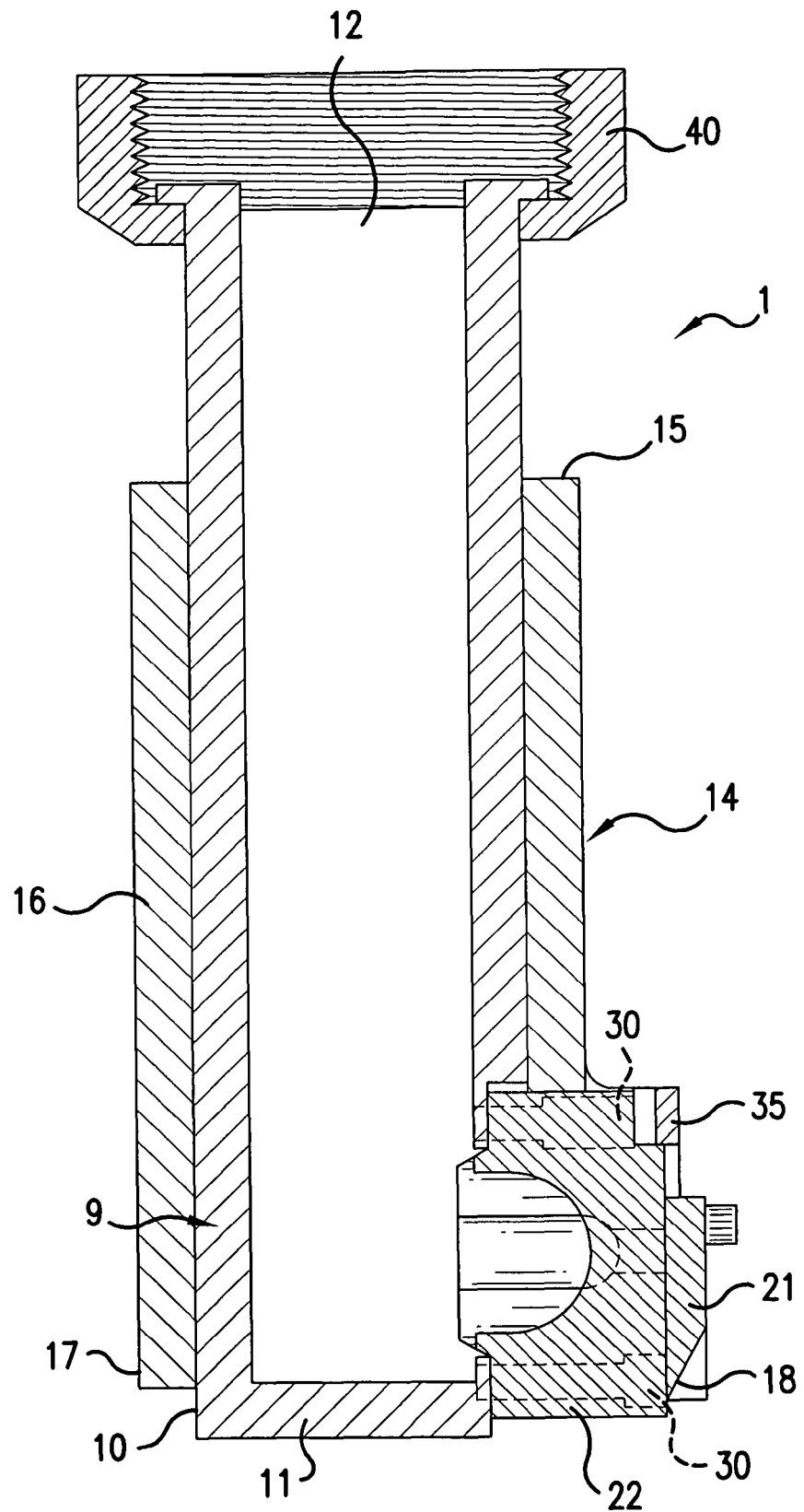
FIG. 5 is a cross-section of the extruder cutter assembly of the present invention along line 5-5 of FIG. 4.

The operation of the die and cutter assembly of the present invention will now be described with reference to FIGS. 2-5. FIG. 2 illustrates the "ready to cut" state, while FIG. 4 illustrates the "after cut" state. Referring to FIG. 2, the mash is forced through the open feed end 12 of the extrusion member 9 from the pressure vessel for containing a mash of food while the cutter member 14 is in the upper position.

The mash is then forced into the cavity 26 formed in the rear of the die 22, into the sub-cavities of the cavity 26 and then through the extrusion outlets 23-25. Due to the shape of the extrusion outlets and the pressure of the mash, the extrudate twists when exiting the die 22. Once a predetermined length of extrudate is fed through the extrusion die 22, the cutter member 14 is moved from the position illustrated in FIG. 2 to the position illustrated in FIG. 4 to cut the extrudate to the predetermined length. The movement of the cutter member 14 drives the cutting surface 18 of the cutting element 21 into cooperation with the extrusion die 22 in order to cut the extrudate.

The above operation occurs continuously with the twisted extrudate exiting the extrusion die 22 and being cut by the reciprocating cutting member 14 in order to produce food products of a predetermined length.

The cutter member 14 is disposed at least partially over and reciprocally slideable on the tubular extrusion wall and is operably connected at the drivable end to a drive device for reciprocatably sliding the cutter member over and away from the extrusion die 22. The rate of number of strokes per minute (down and up) at which the cutter member can operate can range from 80 strokes/minute through 500 strokes/minute.

The length of individual products extruded in accordance with the present invention will depend upon both the rate at which the cutter member operates and the rate at which the product is extruded, the latter being a function of the viscosity of the product in the pressure vessel and the pressure being applied to that product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cutter assembly for an extruder, comprising:
an elongated extrusion member having an open feed end, said open feed end being attachable in fluid communication with a manifold of the extruder for supplying a mash to said elongated extrusion member;
an extrusion die supported on said elongated extrusion member, said extrusion die including a plurality of extrusion outlets formed therein; and a cutter member having an open drivable end, an elongated cutter wall, and an open cutter end with a cutting surface for cutting extrudate to a desired length as the extrudate exits the die, said cutter member being disposed at least partially over and reciprocally slidable on the extrusion member in a direction of elongation of the extrusion member, said cutter member being operably connectable at the drivable end to a drive device of the extruder for reciprocatably sliding the cutting surface of the cutter member over and away from the extrusion die,
wherein each of said plurality of extrusion outlets is shaped to have at least one wide portion and at least one narrow portion, the shape of the extrusion outlets twisting the mash as the mash exits the extrusion die in order to form a twisted food product.

2. The cutter assembly according to claim 1, wherein each of said plurality of extrusion outlets is in the shape of a polygon having concave walls.

3. The cutter assembly according to claim 2, wherein each of said plurality of extrusion outlets has a maximum height of approximately 0.3 to 0.4 inches and a maximum width of 0.2 to 0.3 inches.

4. The cutter assembly according to claim 1, wherein each of said plurality of extrusion outlets is in the shape of a truncated triangle having concave walls.

5. The cutter assembly according to claim 4, wherein each of said plurality of extrusion outlets has a maximum height of approximately 0.3 to 0.4 inches and a maximum width of 0.2 to 0.3 inches.

6. The cutter assembly according to claim 1, wherein each of said plurality of extrusion outlets is in the shape of an hourglass having concave walls.

7. The cutter assembly according to claim 6, wherein each of said plurality of extrusion outlets has a maximum height of approximately 0.3 to 0.4 inches and a maximum width of 0.2 to 0.3 inches.

8. The cutter assembly according to claim 1, wherein there are two of said plurality of extrusion outlets in said extrusion die.

9. A method of operating an extruder having a cutting member, said method comprising the steps of:
providing an elongated extrusion member having an open feed end, said open feed end being attachable in fluid communication with a manifold of an extruder for supplying a mash to said elongated extrusion member;
providing an extrusion die supported on said elongated extrusion member, said extrusion die including a plurality of extrusion outlets formed therein, each of said plurality of extrusion outlets being shaped to have at least one wide portion and at least one narrow portion, the shape of the extrusion outlets twisting the mash as the mash exits the extrusion die;
providing a cutter member having an open drivable end, an elongated cutter wall, and an open cutter end with a cutting surface for cutting extrudate to a desired length as the extrudate exits the die, said cutter member being disposed at least partially over and reciprocally slidable on the extrusion member in a direction of elongation of the extrusion member, said cutter member being operably connectable at the drivable end to a drive device of the extruder for reciprocatably sliding the cutting surface of the cutter member over and away from the extrusion die; and extruding the mash while twisting the mash to form a twisted food product.

10. The method according to claim 9, further comprising the step of shaping each of said plurality of extrusion outlets in the shape of a polygon having concave walls.

11. The method according to claim 10, further comprising the step of providing each of said plurality of extrusion outlets having a maximum height of approximately 0.3 to 0.4 inches and a maximum width of 0.2 to 0.3 inches.

12. The method according to claim 9, further comprising the step of shaping each of said plurality of extrusion outlets in the shape of a truncated triangle having concave walls.

13. The method according to claim 12, further comprising the step of providing each of said plurality of extrusion outlets having a maximum height of approximately 0.3 to 0.4 inches and a maximum width of 0.2 to 0.3 inches.

14. The method according to claim 9, further comprising the step of shaping each of said plurality of extrusion outlets in the shape of an hourglass having concave walls.

15. The method according to claim 14, further comprising the step of providing each of said plurality of extrusion outlets having a maximum height of approximately 0.3 to 0.4 inches and a maximum width of 0.2 to 0.3 inches.

16. The method according to claim 9, further comprising the step of extruding the mash at a pressure of greater than 100 lbs/in$^2$, and said pressure in conjunction with the shape of the plurality of extrusion outlets twists the mash as the mash exits the extrusion die to form the twisted food product.

17. The method according to claim 9, further comprising the step of extruding the mash at a pressure of greater than 150 lbs/in$^2$, and said pressure in conjunction with the shape of the plurality of extrusion outlets twists the mash as the mash exits the extrusion die to form the twisted food product.

18. The method according to claim 9, further comprising the step of providing two of said plurality of extrusion outlets in said extrusion die.

* * * * *